United States Patent
Elkhatib et al.

(10) Patent No.: US 8,605,912 B2
(45) Date of Patent: Dec. 10, 2013

(54) BIPHASE MARK CODE DECODER AND METHOD OF OPERATION

(75) Inventors: Mouna Elkhatib, Tustin, CA (US); Jimmy Pu, Cerritos, CA (US)

(73) Assignee: Conexant Systems, Inc., Irvine, CA (US)

( * ) Notice: Subject to any disclaimer, the term of this patent is extended or adjusted under 35 U.S.C. 154(b) by 409 days.

(21) Appl. No.: 13/092,743
(22) Filed: Apr. 22, 2011
(65) Prior Publication Data

US 2011/0261969 A1    Oct. 27, 2011

Related U.S. Application Data

(60) Provisional application No. 61/327,592, filed on Apr. 23, 2010.

(51) Int. Cl.
*H04R 5/00* (2006.01)
*H04L 7/00* (2006.01)

(52) U.S. Cl.
USPC ............... 381/22; 381/20; 381/21; 375/355; 375/360; 375/361; 341/70; 341/71; 455/226.1; 455/226.2; 704/500

(58) Field of Classification Search
USPC ............... 381/22, 20, 21; 375/355, 360, 361; 341/70, 71; 455/226.1, 226.2; 704/500, 704/503

See application file for complete search history.

(56) References Cited

U.S. PATENT DOCUMENTS

| | | | |
|---|---|---|---|
| 6,573,759 B2 | 6/2003 | Shuholm | |
| 6,933,866 B1 | 8/2005 | Weitz | |
| 2005/0094756 A1* | 5/2005 | Bertram | 375/360 |

* cited by examiner

*Primary Examiner* — Vivian Chin
*Assistant Examiner* — Paul Kim
(74) *Attorney, Agent, or Firm* — Jackson Walker L.L.P.; Christopher J. Rourk

(57) ABSTRACT

Biphase mark codes (BMC) are used in digital communications. Most BMC formats use preambles for rate determination and synchronization. A decoder compares the intervals of continuous high or continuous low voltages in a BMC stream to predetermined minimum and maximum values of half cell, full cell and one-and-a-half cell intervals for all supported sampling rates. If a pattern matching a preamble is found, the sampling rate is locked in and the decoder is synchronized to the BMC stream. Once locked, the decoder uses the predetermined minimum and maximum values at the locked rate to generate half cell, full cell and one-and-a-half cell indicators for a decoding state machine which decodes data in the BMC stream or decodes expected preambles.

19 Claims, 10 Drawing Sheets

| RATE | MIN 0.5T | MAX 0.5T | MIN 1T | MAX 1T | MIN 1.5T | MAX 1.5T |
|---|---|---|---|---|---|---|
| 192kHz | 0 | 17 | 19 | 29 | 31 | 44 |
| 96kHz | 16 | 37 | 39 | 61 | 63 | 89 |
| 48kHz | 35 | 69 | 71 | 121 | 123 | 179 |

FIG. 5

| STATE | INPUT | ACTION | NEXT STATE |
|---|---|---|---|
| 802 | 0.5T | --- | 804 |
| 802 | 1.0T | DECODE "0" | 802 |
| 802 | 1.5T | ENTER STATE MACHINE 820 | --- |
| 804 | 0.5T | DECODE "1" | 802 |
| 804 | 1.0T/1.5T | --- | 810 |
| 810 | ANY | RESET STATE MACHINE. RETURN TO SYNCHRONIZATION MODE | 802 |

FIG. 9

| STATE | INPUT | CELL COUNTER | ACTION | NEXT STATE |
|---|---|---|---|---|
| 802 | 0.5T | 0-27 | --- | 804 |
| 802 | 0.5T | 28 | --- | 810 |
| 802 | 1.0T | 0-27 | DECODE "0", INCREMENT CELL COUNTER | 802 |
| 802 | 1.0T | 28 | --- | 810 |
| 802 | 1.5T | 0-27 | --- | 810 |
| 802 | 1.5T | 28 | ENTER STATE MACHINE 820*, RESET CELL COUNTER | --- |
| 804 | 0.5T | 0-27* | DECODE "1", INCREMENT CELL COUNTER | 802 |
| 804 | 1.0T/1.5T | 0-27* | --- | 810 |
| 810 | ANY | ANY | RESET STATE MACHINE. RETURN TO SYNC. MODE, RESET CELL COUNTER | 802 |

*- NOT POSSIBLE FOR CELL COUNTER TO BE 28 WHEN IN STATE 804

BIPHASE MARK CODE DECODER AND METHOD OF OPERATION

RELATED APPLICATIONS

This application claims priority to U.S. provisional application 61/327,592, filed Apr. 23, 2010, entitled "BIPHASE MARK CODE DECODER," which is hereby incorporated by reference for all purposes.

TECHNICAL FIELD

The application relates generally to communication systems, and specifically to a decoder for signals encoded using biphase mark encoding.

BACKGROUND OF THE INVENTION

In many digital communication systems, data is transmitted as a sequence of high and low voltage signals without an accompanying clock signal. In addition, many systems support multiple sampling rates of the signal. For an unknown digital signal, a receiver can therefore need to determine the incoming sampling rate. Rate determination of and synchronization to a received signal are often difficult to accomplish for a conventional digital signal, particularly if there are long stretches of high digital values or low digital values. During such periods, there are no transitions in the signal that can be used as a reference for synchronization or rate synchronization.

Biphase mark coding (BMC) was developed to address this difficulty in traditional digital signals. Like a traditional digital signal, one bit is transmitted for each clock cycle. Unlike a traditional digital signal, between each bit a transition in polarity (from high to low or low to high) occurs. In order to transmit a "1" value, a transition also occurs after half a clock cycle (a clock cycle can also be referred to as a cell). To transmit a "0" value, no transition occurs in the middle of a cell. Therefore, to decode a signal encoded using BMC, a determination in each cell is made as to whether a transition occurs in the middle of the cell or not. If no transition occurs, a "0" value is interpreted, and if a transition occurs a "1" value is interpreted.

FIG. 1 illustrates a signal encoded using BMC. Signal 102 is a reference clock signal, signal 104 is a source digital data signal and signal 108 is a BMC encoded digital signal. The binary values are indicated by arrow 106. The BMC encoded signal has an equal number of highs and lows.

Preambles can also be added to a BMC-encoded signal. The preamble is defined by communications protocol used and can comprise one or more intervals of 1½ cell periods with no transitions. When using BMC, a transition should occur at least within 1 cell period, so an interval of 1½ cell periods cannot occur normally as part of the incoming data. The preamble thus provides an anomaly which can be located for synchronization purposes.

FIG. 2 illustrates preambles used in the Sony/Phillips Digital Interconnect Format (SPDIF). The B preamble 202 comprises 4 cells, but contains two intervals of 1½ cell periods with no transition (indicated by arrows 212 and 214), and is an instance of a preamble when the preceding cell concluded with a low value. B preamble 204 is an instance of a preamble with a complementary polarity that is used when the preceding cell concludes with a high value. The SPDIF format also defines an "M" preamble and a "W" preamble. M preambles are indicated by arrow 222 and by arrow 224, having complementary polarity. W preambles are indicated by arrow 232 and by arrow 234, having complementary polarity.

The preambles enable receivers to more easily synchronize an incoming data signal to an internal clock signal and to recover the data, such as by using a phase locked loop (PLL) to phase align a transition in the incoming data signal to a clock signal.

SUMMARY OF THE INVENTION

A BMC decoder comprising an interval width comparator with a synchronization module and an interval width discriminator module and a decoder state machine, and optionally comprising an interval counter and a lookup table which can store the maximum and minimum values described below. The synchronization module compares the most recent interval widths with maximum and minimum values for the 0.5T interval, the 1.0T interval and the 1.5T interval for each of the supported sampling rates. The synchronization module determines on the basis of the maximum and minimum values whether the recent interval widths match a preamble pattern. If a preamble pattern is matched the sampling rated is locked in and the interval width discriminator module provides interval indicators to the decoder state machine to decode the input BMC stream.

With the sampling rate locked in, interval width discriminator module compares each interval width received with the maximum and minimum values for a 0.5T interval, a 1.0T interval and a 1.5T interval for the locked sampling rate and provides either an 0.5T indicator, 1.0T indicator or 1.5T indicator to the decoder state machine.

The interval counter counts the number of oversampling clock cycles between transitions from a high voltage state to a low voltage state in the BMC stream and between transitions from low voltage states to a high voltage state in the BMC stream. The oversampling clock cycle is typically a multiple of the highest sampling rate supported by the BMC decoder.

The interval counter can comprise a high pulse counter which counts consecutive oversampling clock cycles while the input to the BMC decoder is high and a low pulse counter which counts consecutive oversampling clock cycles while the input to BMC decoder is low. Two examples of BMC stream formats are SPDIF and Audio Engineering Society 3 (AES3) format.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views, and in which:

FIG. 5 is an exemplary lookup table having maximum and minimum values for each supported rate, 48 kHz, 96 kHz, and 192 kHz;

FIG. 9 is a state transition table which provides more detail into the operation of state transition diagram in FIG. 8;

FIG. 10 is a state transition table for another embodiment of the decoder state machine.

DETAILED DESCRIPTION OF THE PREFERRED EMBODIMENTS

A detailed description of embodiments of the present invention is presented below. While the disclosure will be described in connection with these drawings, there is no intent to limit it to the embodiment or embodiments disclosed herein. On the contrary, the intent is to cover all alternatives, modifications and equivalents included within the spirit and scope of the disclosure as defined by the appended claims.

It should be noted that while examples are set forth using SPDIF as the communications format, this approach can be applied to any suitable type of BMC-encoded data signal.

Figure 1:
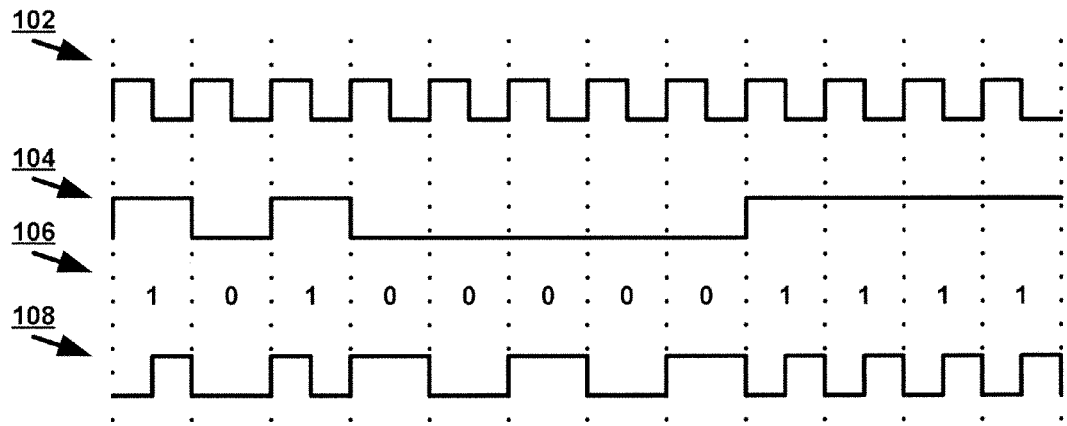
FIG. 1 illustrates an exemplary signal encoded using BMC.
Figure 2:
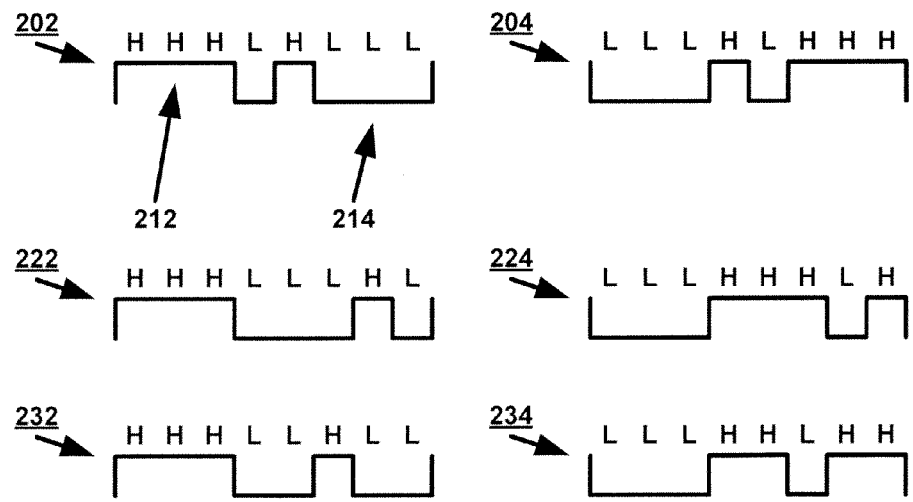
FIG. 2 illustrates preambles used in SPDIF.
Figure 3:
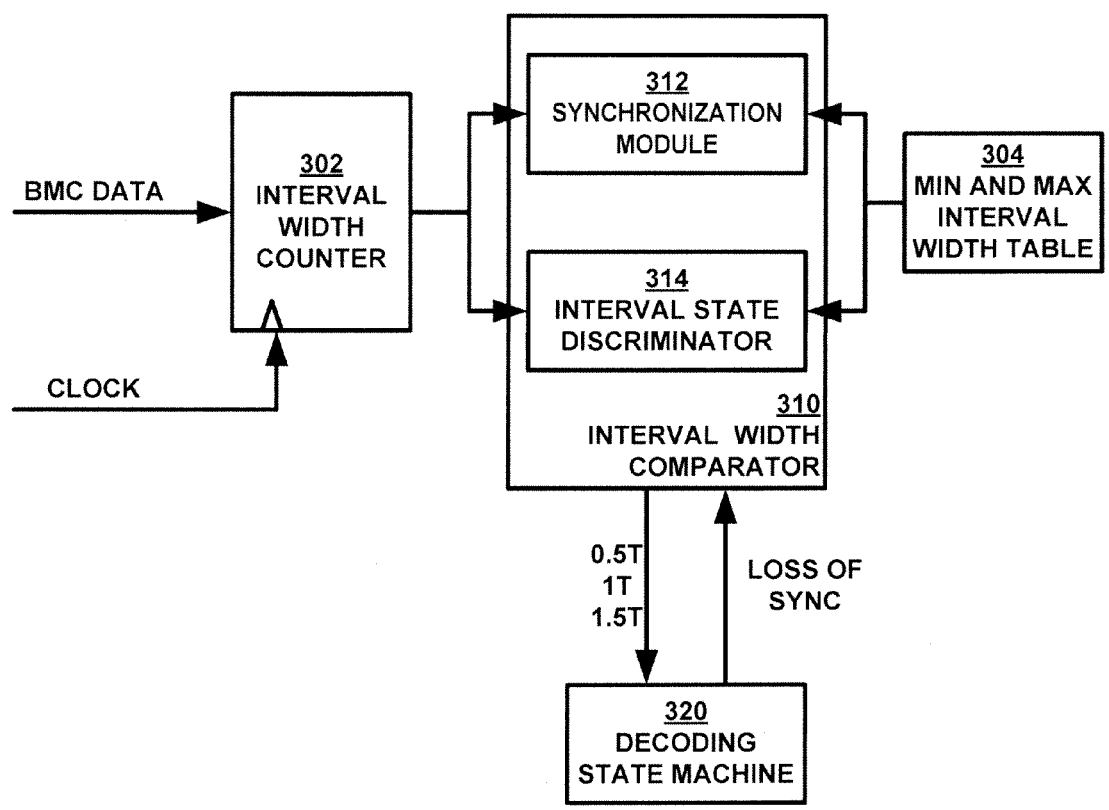
FIG. 3 is a BMC decoder in accordance with an embodiment of the invention.

FIG. 3 is a diagram of BMC decoder 300 in accordance with an exemplary embodiment of the present disclosure. BMC decoder 300 can be, implemented in hardware or a suitable combination of hardware and software, and can be one or more integrated circuits. As used herein and by way of example and not by limitation, "hardware" can include a combination of discrete components, an integrated circuit, an application-specific integrated circuit, a field programmable gate array, a general purpose processing or server platform, or other suitable hardware. As used herein and by way of example and not by limitation, "software" can include one or more objects, agents, threads, lines of code, subroutines, separate software applications, one or more lines of code or other suitable software structures operating in one or more software applications or on one or more processors, or other suitable software structures. In one exemplary embodiment, software can include one or more lines of code or other suitable software structures operating in a general purpose software application, such as an operating system, and one or more lines of code or other suitable software structures operating in a specific purpose software application.

BMC decoder 300 includes interval width counter 302, interval width comparator 310, decoding state machine 320, and min and max interval width table 304, which contains maximum and minimum interval widths for each supported data rate. Interval width counter 302 receives the BMC-encoded data signal and an oversampling clock signal. In one exemplary embodiment, the oversampling clock signal can be greater than twice maximum sampling rate of the BMC-encoded data signal, such as several times greater. Interval width counter 302 counts the number of oversampling clock periods that occur between transitions from a high to low data value and a low to high data value, such as to alternatively measure the duration of each period of low signal and of high signal in the BMC-encoded data signal.

Interval width comparator 310 functions in two modes, synchronization mode in conjunction with synchronization module 312, and decoding mode in conjunction with interval state discriminator module 314. In synchronization mode, interval width comparator 310 examines the last n interval widths and compares them against known acceptable ranges for each supported rate, based on a preamble symbol. Examples are given below with respect to FIGS. 5 and 6. If a match is found, then a preamble has been found and interval width comparator 310 switches to decoding mode. If no match is found, interval width comparator 310 continues searching for a preamble.

In synchronization mode, a specific preamble can be sought, such as any suitable selected preamble. For example, in the SPDIF communications format, a signal is divided into frames comprising 32 cells, where the first 4 cells can be reserved for a preamble. The next 24 cells can contain 24 bits of audio/payload data and the remaining cells contain 4 bits of housekeeping data. The signal can also be divided into blocks each comprising 192 frames. Some of the housekeeping or header information, such as a status is distributed across the 192 frames in a block, while other housekeeping information such as a parity bit, is only associated with the present frame. A "B" preamble is used in the first frame of each block, an "M" preamble is used for frames containing audio data in a first audio channel and the "W" preamble is used for frames containing audio data in a second audio channel, if present. For example, the first channel could be a left stereo channel and the second channel could be a right stereo channel. Alternatively, the audio signal could be monaural without a second channel.

In one embodiment of an SPDIF decoder, the interval width comparator in synchronization mode can simultaneously search for B, M and W preambles. However, because housekeeping data is spread across a block, reception of a partial block may not present sufficient information to process the audio stream. Therefore, the benefits of synchronizing to an M or W preamble do not justify the additional complexity needed in the interval width comparator to search for multiple preambles. In another embodiment of an SPDIF decoder, the interval width comparator in synchronization mode searches only for the B preamble.

In decoding mode, interval width comparator 310 compares the current interval width supplied by interval width counter 302 with acceptable ranges for 1.5T, 1T and 0.5T (where T is the sampling period of the sampling rate determined during the synchronization mode). If the interval width does not match an acceptable range for 1.5T, 1T or 0.5T, synchronization has been lost and interval width comparator 310 returns to synchronization mode. Otherwise, an indication or symbol for 1.5T, 1T or 0.5T is transmitted to decoder state machine 320.

Decoder state machine 320 receives 1.5T, 1T or 0.5T indicators and uses those inputs to extract the data in the BMC-encoded data signal. If an illegal or unexpected indicator is received, decoder state machine 320 indicates a loss of sync to interval width comparator 310, which then switches to synchronization mode.

In one exemplary embodiment, lookup table 304 can be used to provide a minimum and maximum acceptable widths for 0.5T, 1T and 1.5T for each data rate supported.

Figure 4A:
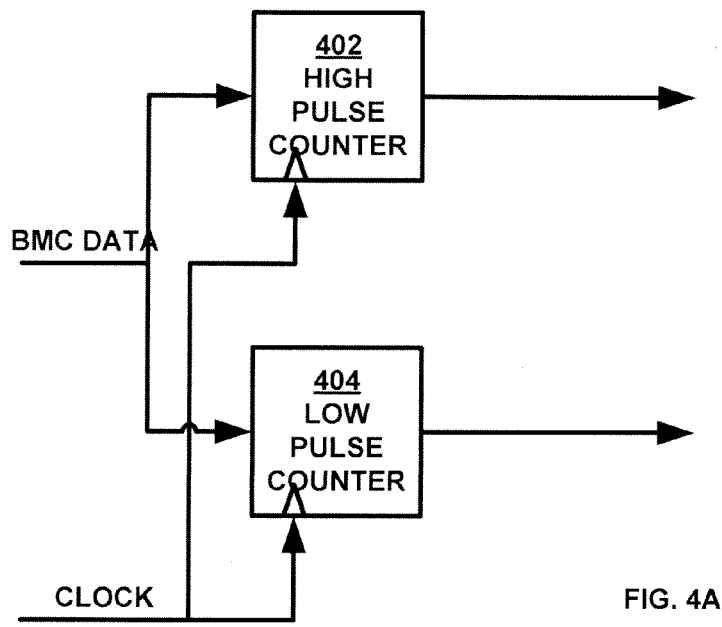
FIG. 4A and 4B shows embodiments of the interval width counter.

FIG. 4A shows an embodiment of interval width counter 302 in accordance with an exemplary embodiment of the present disclosure. In FIG. 4A, interval width counter 302 comprises two pulse counters, high pulse counter 402 and low pulse counter 404. High pulse counter 402 measures the width of pulses where the input signal is high, and low pulse counter 404 measures the width of the pulses where the input signal is low. A high pulse count output and a low pulse count output are thus generated.

Figure 4B:
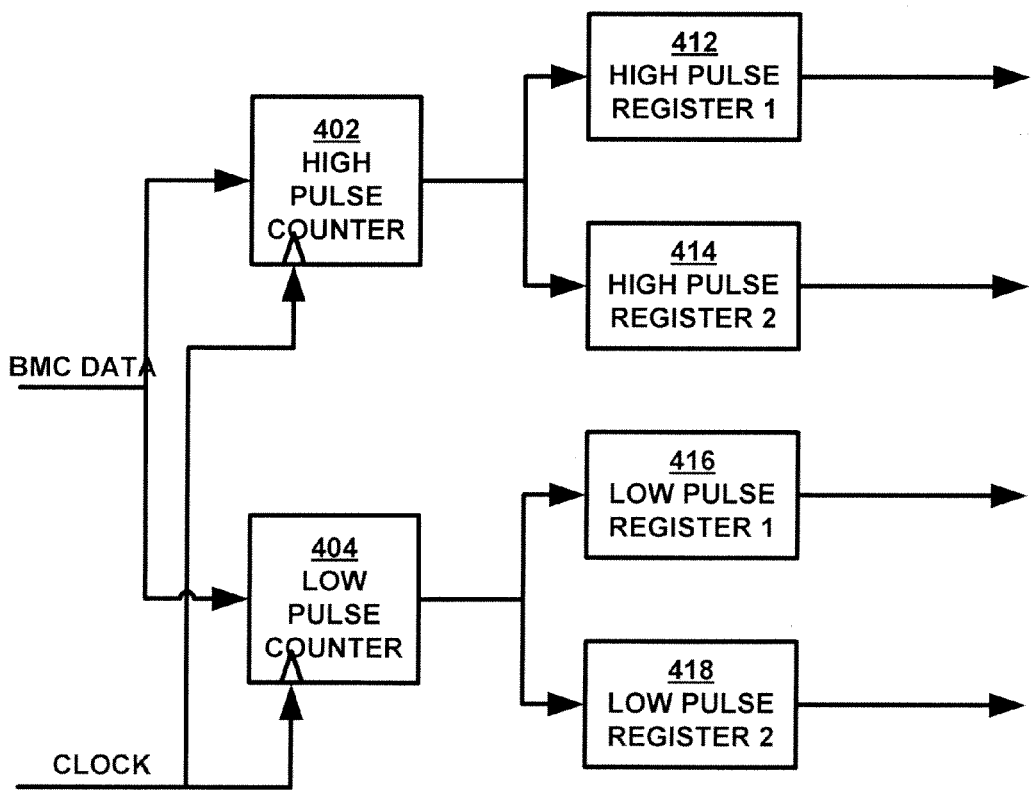

FIG. 4B shows another embodiment of interval width counter 302 in accordance with an exemplary embodiment of the present disclosure. In FIG. 4B, interval width counter 302 also comprises high pulse counter 402 and low pulse counter 404, and additionally comprises high pulse register 412 and high pulse register 414, which store the two most recent high pulse widths. Interval width counter 302 of FIG. 4B further comprises low pulse register 416 and low pulse register 418 for storing the two most recent low pulse widths. In this manner, the last 4 interval widths can be provided to interval width comparator 310. In the situation where the BMC-encoded data signal is SPDIF or AES3, the preamble symbols can span 4 intervals, so the interval width counter of FIG. 4B provides the 4 interval widths needed to identify a preamble.

FIG. 5 is an exemplary lookup table having maximum and minimum values for exemplary supported rates of 48 kHz, 96 kHz, and 192 kHz in accordance with an exemplary embodiment of the present disclosure. In this exemplary embodiment, the frequency of the oversampling clock used is 294.912 Mhz, but other suitable sampling frequencies can also or alternatively be used. For the following flowchart, descriptions and examples using this table are given.

Figure 6:
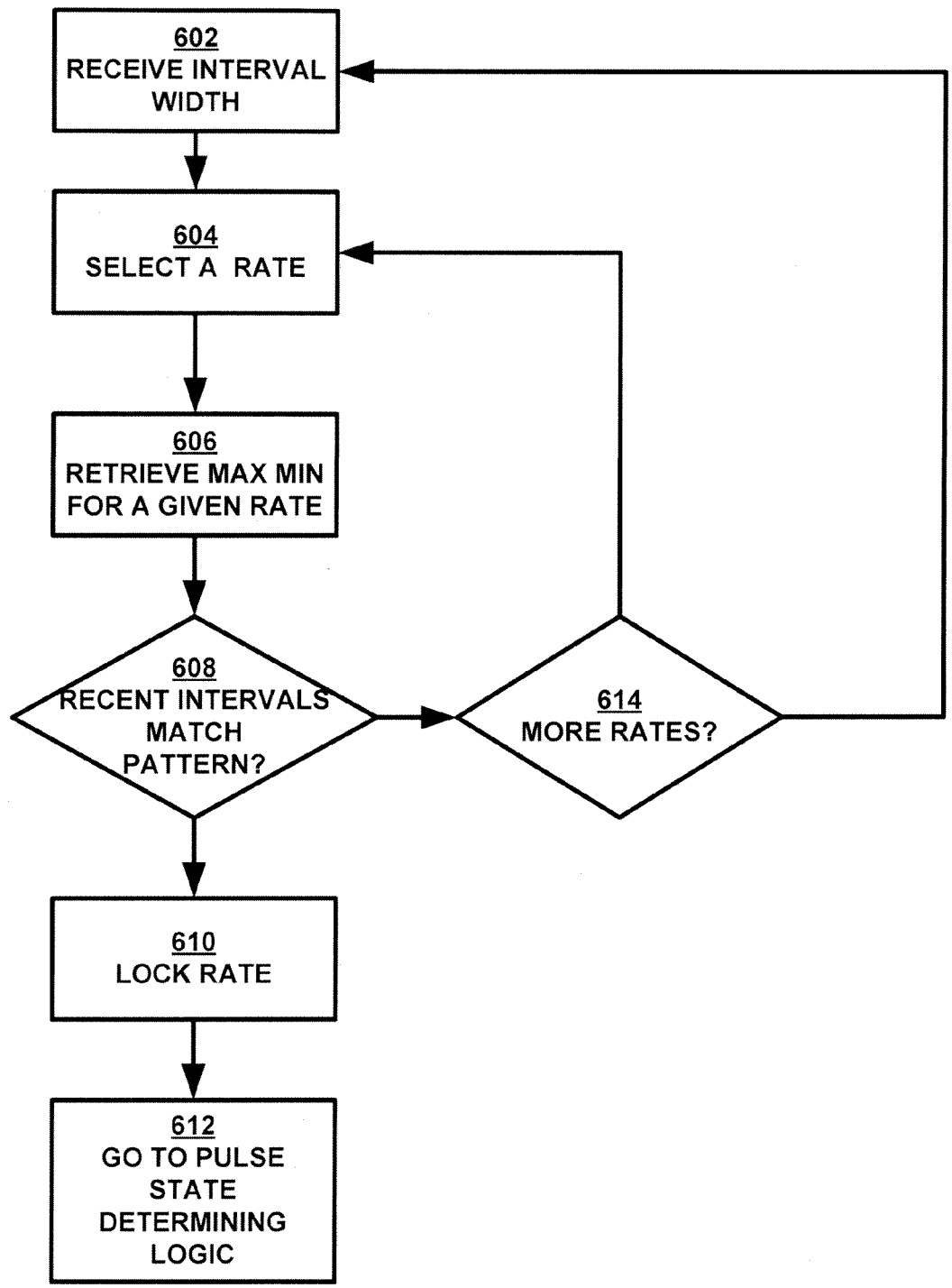
FIG. 6 is a flowchart of an exemplary method of operating in synchronization mode.

FIG. 6 is a flow chart algorithm for operating in synchronization mode in accordance with an exemplary embodiment of the present disclosure. The algorithm can be implemented in software, such as one or more computer programs operating on a digital signal processor or other suitable processors, or in hardware, such as a field programmable gate array. In this exemplary embodiment, a B preamble is used, but any suitable preamble of any suitable BMC format could also or alternatively be used.

At 602, an interval width is received, such as by receiving a data signal with an encoded measured interval width. At 604, a rate is selected, such as by selecting a suitable sampling rate using hardware or software processes, such as 192 kHz. The algorithm then proceeds to 606.

At 606, the minimum and maximum values for 0.5T, 1T and 1.5T are retrieved, such as by using suitable commands to read a data memory. At 608, a decision is made as to whether the past intervals seen match a preamble pattern, e.g., 1.5T, 0.5T, 0.5T and 1.5T for a B preamble. In one exemplary embodiment, this decision can be made by using programmed data processors or logic devices to compare measured intervals to stored intervals. Continuing this example, suppose the last four intervals had lengths of 35, 80, 17 and 24. According to the table for 192 kHz, the first interval matches 1.5T, the second interval is out of range, the third interval matches 0.5T and the fourth interval matches 1T. Because one interval is out of range, the past intervals do not match the B preamble pattern. If no match is found as in this example, the algorithm proceeds to 614.

At 614, a decision is made as to whether all supported rates have been exhausted, such as by use of a logic diagram implemented in hardware or software. If all supported rates have not been exhausted, the process repeats at 604. In another example, the rate 96 kHz can be selected next, where the four intervals correspond to 0.5T, 1.5T, 0.5T and 0.5T, respectively. While all four exemplary intervals have valid widths according to the maximum/minimum values, they do not match the B preamble pattern. Therefore, the process in this example would repeat again for the last rate, namely, 48 kHz. While the first two intervals correspond to 0.5T and 1T, the last two intervals do not fall within a valid range, so at 614 in this example, there are no remaining rates left to try and the process returns to 602 where another interval width is received.

In a further example, if an interval width of 76 is received next, the last four intervals become 80, 17, 24 and 76. On the first iteration of the algorithm at 192 kHz, the second and third interval widths match 0.5T and 1T, respectively, but the first and fourth interval widths are out of range. On the second iteration of the algorithm, at 96 kHz, the four interval widths match 1.5T, 0.5T, 0.5T and 1.5T respectively, which is a B preamble pattern. Because a match has been determined, the sampling rate is locked in at 610 and the process moves to decoding mode at 612. In this example, the rate of 96 kHz is locked in using the flow chart algorithm of FIG. 6.

Figure 7:
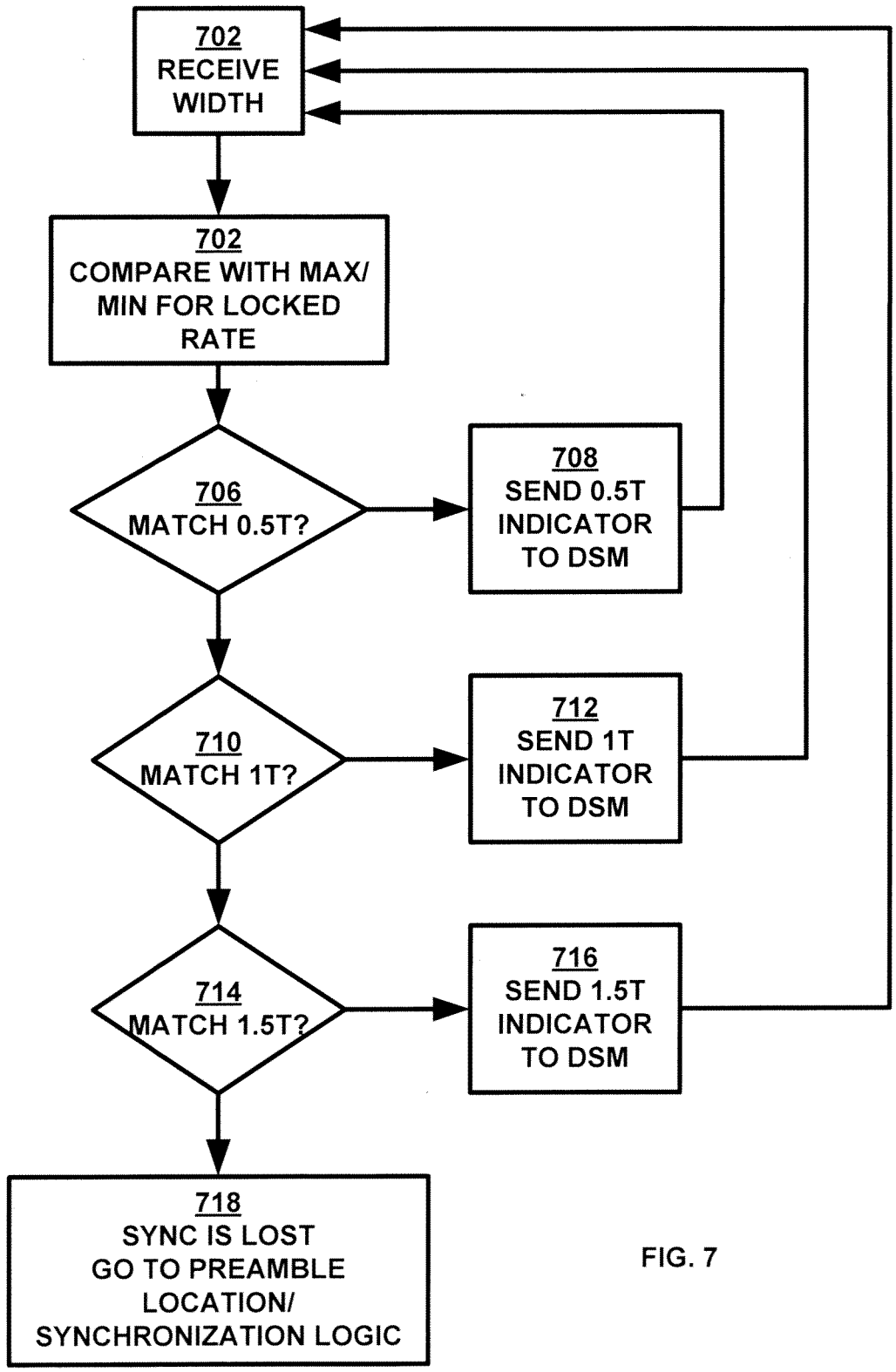
FIG. 7 is a flowchart illustrating the operation of the interval width comparator in decoding mode.

FIG. 7 is a flow chart algorithm for operating an interval width comparator in decoding mode in accordance with an exemplary embodiment of the present invention. The algorithm can be implemented in software, such as one or more computer programs operating on a digital signal processor or other suitable processors, or in hardware, such as a field programmable gate array. In this exemplary embodiment, a B preamble is used, but any suitable preamble of any suitable BMC format could also or alternatively be used.

At 702, an interval width is received, such as by receiving a detected interval width that has been encoded in a data signal. At 704, the width is compared with the maximum and minimum values for a rate, such as a rate that has been locked in at 610 of FIG. 6 or using other suitable algorithmic processes. At 706, a determination is made as to whether the width fits into the range for 0.5T, such as by performing a compare algorithm using the detected interval width and range data stored in a digital memory. If a fit is detected, a 0.5T indicator is sent to decoder state machine 320 at 708, such as by transmitting a data signal. At 710, a determination is made as to whether the width fits into the range for 1T, using similar processing as those previously discussed. If a fit is detected, a 1T indicator is sent to decoder state machine 320 at 712. The algorithm then proceeds to 714.

At 714, a determination is made as to whether the width fits into the range for 1.5T. If it does, a 1.5T indicator is sent to decoder state machine 320 at 716. If the width does not match any suitable of the above, a loss of sync and the interval width comparator is generated at 718 and the algorithm returns to synchronization mode.

Returning to the previous example, if an interval width of 54 is subsequently received/detected, a comparison would generate a match with 1T at 96 kHz, the locked rate, and a 1T indicator would be generated and transmitted to decoder state machine 320. If an interval width of 62 is received, a comparison would fail to generate a match at 0.5T, 1T or 1.5T, so a loss of sync signal would be generated.

Referring back to FIG. 3, decoder stage machine 320 is used to decode the data signal when receiving a sequence of 1.5T, 1T and 0.5T indicators. At its simplest, decoder state machine 320 comprises two states. In a base state, if it receives a 1T indicator, the state machine outputs a "0" binary value. If decoder state machine 320 receives a 0.5T indicator at the base state, then half a cell has been seen and another 0.5T indicator should be seen. As a result, decoder state machine 320 transitions to a wait state. If decoder state machine 320 is in a wait state and it receives a 0.5T indicator, it outputs a "1" binary value. However, if any other output is received, then an error has occurred and a "loss of sync" message is sent to interval width comparator 310. If no errors occur, decoder state machine 320 can return to the base state when a new cell is encountered.

This state machine is provided as a simple example, but it provides a basis for a more complex decoder state machine. For example, in this example the occurrence of preambles is not accounted for, but preambles could be processed by a suitable state machine for use in a system that receives data encoded with preambles.

Figure 8:
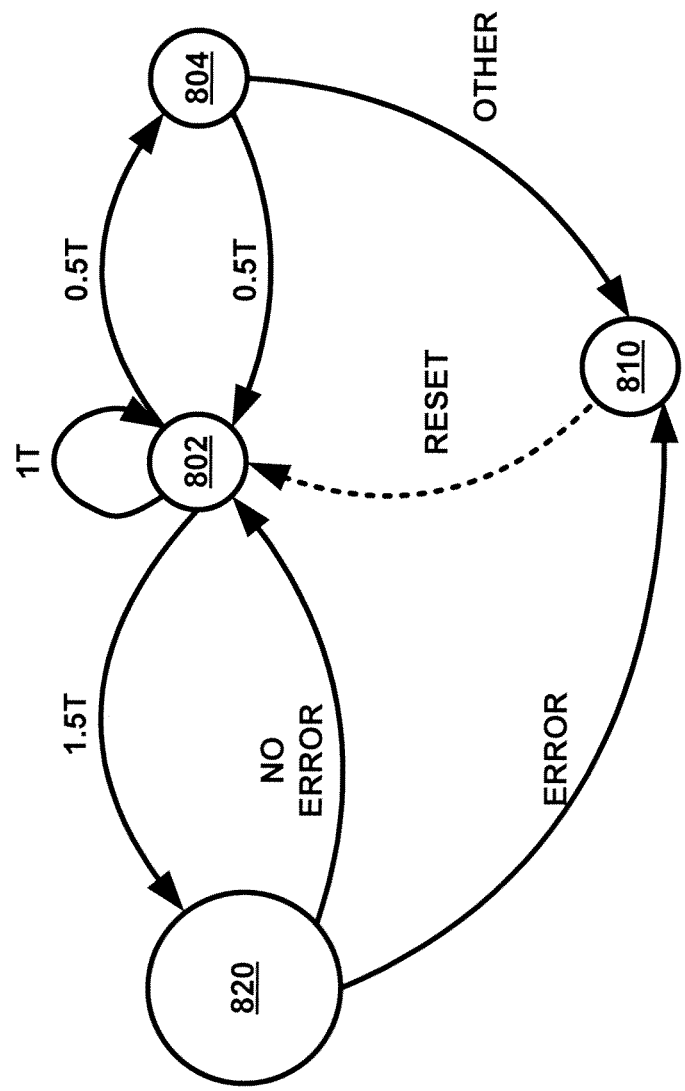
FIG. 8 illustrates a state transition diagram for a decoder state machine including preamble processing.

FIG. 8 is a state transition diagram for a decoder state machine including preamble processing in accordance with an exemplary embodiment of the present disclosure. The decoder state machine of FIG. 8 can be employed in a suitable BMC message format where all preambles begin with a 1.5T interval, such as in the SPDIF format, or in other suitable message formats. The states and transitions of FIG. 8 and other state machines can be implemented using software algorithms using known programming techniques, using logic devices, or in other suitable manners.

State 802 is a base state in the decoder state machine. Upon successful processing of a preamble or a bit of data, such as by a processor programmed as discussed herein or in a suitable arrangement of logic devices, the decoder state machine returns to the base state. Within the state transition diagram is state machine 820 which is a state machine for processing one or more preambles. State 804 is a wait state where the decoder state machine transitions to after receiving a 0.5T indicator. State 810 is used as a convenience to indicate a loss of sync state. However, state 802 can simply be the base state after transmission of a loss of sync message to the interval width comparator.

FIG. 9 is a state transition table which provides more detail into the operation of the state transition diagram shown in FIG. 8. In state 802, if a 0.5T indicator is received, the state machine proceeds to state 804. If a 1T indicator state is received, a "0" is decoded and the state machine returns to state 802. If a 1.5T indicate is received preamble processing takes place within state machine 820. In the examples to follow, the state machine would begin by transitioning to state 1102 in FIG. 11 for example. The specifics of state machine 820 depends on the preambles defined by the communications format.

In state 804, if a 0.5T indicator is received, a "1" is decoded and the state machine returns to state 802. If any suitable other indicator is received, the state machine transitions to the 810 error state where a loss of sync message is sent to interval width comparator which switches to synchronization mode.

In state 810, a loss of sync message is sent and the state machine resets to state 802. Once interval width comparator synchronizes once again, the state machine is ready to decode incoming indictors into binary data.

The state machine can transition out of preamble state machine 820 either in an error state or not in an error state. If it is in error state it transitions to state 810. If it is not in an error state it transitions to state 802. This is more clearly indicate by subsequent state transition diagrams shown in FIGS. 11-14.

The state machine of FIG. 8 can permit the occurrence of a preamble anywhere within a stream. Since preambles occur at the start of frames, an error can be generated if a preamble is detected sooner or is missing. For example, in an SPDIF communications format, a preamble can occur every 32 cells, and a B preamble can occur every 192 frames. A cell counter can be implemented to enhance the error detection of the decoder state machine.

FIG. 10 is a state transition table for another embodiment of a decoder state machine in accordance with the present disclosure. In this exemplary embodiment, the state machine is responsive to an indicator input but also to the counter value. When the decoder state machine is enabled after synchronization, the cell counter is set to zero. In state 802, if the counter value is less than 28, then either a 0.5T indicator or 1T indicator is expected. If a 1T indicator is received and the counter value is less than 28, the state machine decodes a "0", increments the cell counter and returns to state 802. If a 0.5 indicator is received and the counter value is less than 28, the state machine transitions to state 804. If either a 0.5T indicator is received or 1T indicator is received and the counter value is 28, a loss of sync error has occurred and the state machine transitions to state 810.

If a 1.5T indicator is received and the counter value is less than 28, a loss of sync error has occurred, because a preamble is expected but has not been received.

If a 1.5T indicator is received and the counter value is 28, the state machine transitions into the preamble state machine 820. Upon an error free return from preamble state machine 820, the cell counter is reset to zero.

Because the cell counter is not incremented in transitioning to state 804, a counter value of 28 is not achievable in state 804 and hence the logic is the same as in FIG. 9. Upon entering state 810, the cell counter is reset so that the decoder state machine is reset and ready to decode data once synchronization is reestablished.

Figure 11:
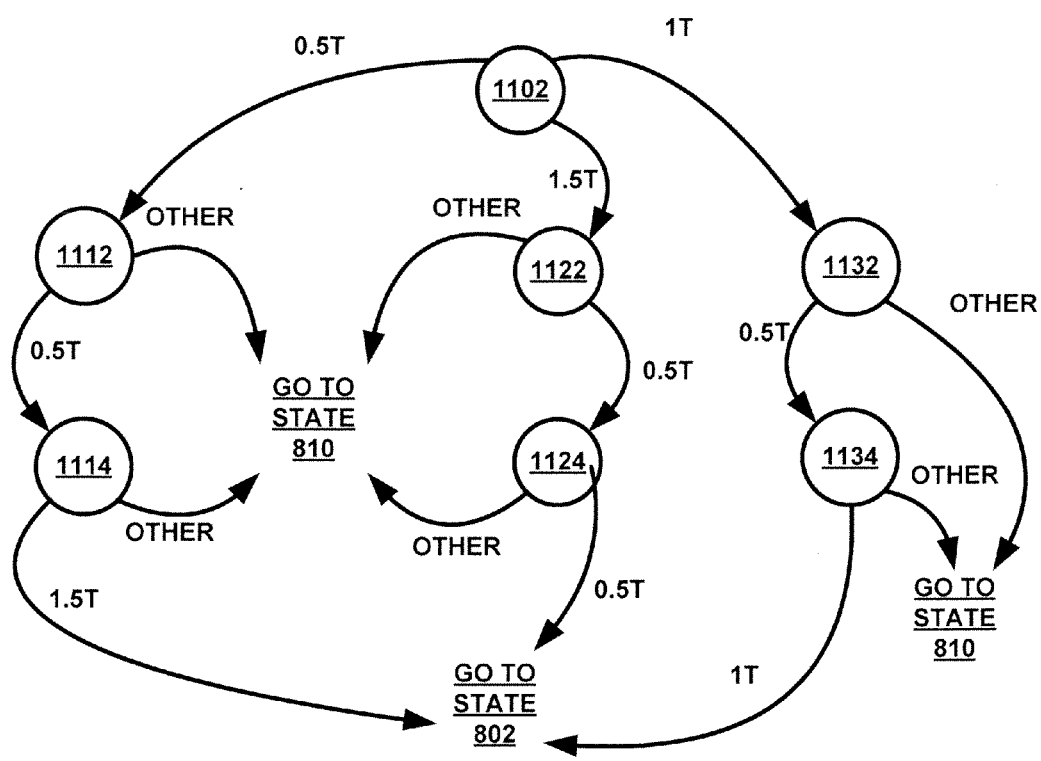
FIG. 11 is a state transition diagram for an implementation of a preamble state machine in accordance with the SPDIF communications format.

FIG. 11 is a state transition diagram for an implementation of preamble state machine 820 in accordance with an SPDIF communications format, in an exemplary embodiment of the present disclosure. Upon transition from state 802, the state machine enters state 1102. If a 0.5T indicator is received, it will match the start of a B preamble and the decoder state machine will transition to state 1112, which is the portion of the state machine which processes B preambles. If a 1.5T indicator is received, this matches the start of an M preamble and the decoder state machine transitions to state 1122 which is the portion of the state machine which processes M preambles. If a 1T indicator is received, this matches the start of a W preamble and the decoder state machine transitions to state 1132 which is the portion of the state machine which processes W preambles.

At state 1112, a 0.5T indicator is expected. If that indicator is received, the state machine transitions to state 1114, where a 1.5T indicator is expected. If that indicator is received, the state machine has successfully processed a B preamble and the state machine returns to state 802. If the expected indicators were not received at state 1112 or 1114, the state machine returns to state 810 where a loss of sync is processed.

At state 1122, a 0.5T indicator is expected. If that indicator is received, the state machine transitions to state 1124, where a 0.5T indicator is expected. If that indicator is received, the state machine has successfully processed an M preamble and the state machine returns to state 802. If the expected indicators were not received at state 1122 or 1124, the state machine returns to state 810 where a loss of sync is processed.

At state 1132, a 0.5T indicator is expected. If that indicator is received, the state machine transitions to state 1134, where a 1T indicator is expected. If that indicator is received, the state machine has successfully processed a W preamble and the state machine returns to state 802. If the expected indicators were not received at state 1132 or 1134, the state machine returns to state 810 where a loss of sync is processed.

It should be noted that because it is known when a particular preamble should be received, logic can be used to generate a loss of sync error when the wrong preamble is received. For example, the B preamble occurs at the first frame of very block, so a frame counter can be used. If a 0.5T indicator is received at state 1102 and the frame count is not 192, then a loss of sync error has occurred. Additionally, a particular system can define that the M preambles and W preambles alternate. In such a system, when a 1.5T indicator is received an odd frame number would yield a loss of sync error. The specifics of the logic depending on the communications protocol and can also be further enhanced by knowledge of the type of signal received (e.g., a monaural signal would have no W preambles).

The construction of the lookup table of maximum and minimum values as well as the selection of the oversampling rate takes several factors into account. The higher the oversampling rate is, the more accurate the decoding and the synchronization will be. However, the faster the oversampling clock rate is, the more expensive it will be to construct. Furthermore a high speed clock can also result in unwanted high frequencies being generated in systems and components.

As a result, in one embodiment of the invention, the maximum and minimum values for multiple oversampling frequencies are stored, to enable the end user of the system to decide whether accuracy is worth the added expense of a high speed clock. For example, an exemplary lookup table could contain maximum and minimum values for 48 kHZ, 96 kHz, and 192 kHz data frequency and 147 MHz, 196 MHz, 245 MHz and 294 MHz oversampling frequencies.

The selection of the actual maximum and minimum values can vary depending on the amount of sampling clock jitter, encoded data jitter, drift and pulse width distortion due to the receiver input comparator that are to be accounted for. When data rates such as 48 kHz, 96 kHz, and 192 kHz are used, the ranges can be fairly wide as the table in FIG. 5, where nearly every width between the minimum for 0.5T and the maximum for 1.5T is accounted for, with the possible exception of widths on the boundary between 0.5T and 1T and between 1T and 1.5T. However, if less jitter and drift are expected, the ranges can be made smaller. In that case, other data sampling rates could be distinguished.

For example, in the examples given above, 44.1 kHz and 48 kHz are too close in range. However, given a high enough oversampling rate and narrower ranges for 0.5T, 1T and 1.5T, the BMC decoder described above could be used. However, it can be difficult to distinguish a very jittery 44.1 kHz signal from a 48 kHz signal.

It should be emphasized that the above-described embodiments are merely examples of possible implementations. Suitable variations and modifications can be made to the above-described embodiments without departing from the principles of the present disclosure. For example, examples given in the context of SPDIF formatting can be applied to any suitable BMC coding format using preambles for synchronization. All such modifications and variations are intended to be included herein within the scope of this disclosure and protected by the following claims.

What is claimed:

1. A decoder comprising:
an interval width comparator comprising a synchronization module and an interval width discriminator module; and
a decoder state machine;
wherein the synchronization module is configured to compare a plurality of past interval widths with a plurality of maximum and minimum data values for a 0.5 T interval, a 1.0 T interval and a 1.5 T interval for a plurality of sampling rates and to determine whether a match with a preamble pattern comprising some or all of the group consisting of 0.5 T interval, 1.0 OT interval and 1.5 T interval has been detected, and to select a sampling rate when a match is detected.

2. The decoder of claim 1 wherein the interval width discriminator module is configured to receive an interval width, to compare the interval width with a plurality of maximum and minimum values for a 0.5 T interval, a 1.0 T interval and a 1.5 T interval for the sampling rate selected by the synchronization module, and to provide an 0.5 T indicator, 1.0 T indicator or 1.5 T indicator to the decoder state machine.

3. The decoder of claim 1 further comprising a lookup table storing the plurality of maximum and minimum data values.

4. The BMC decoder of claim 1 further comprising an interval counter operable to count oversampling clock cycles between transitions between a low voltage and a high voltage.

5. The BMC decoder of claim 1 further comprising a high pulse counter operable to count consecutive oversampling clock cycles while the input to the BMC decoder is high and a low pulse counter operable to count consecutive oversampling clock cycles while the input to BMC decoder is low.

6. The BMC decoder of claim 1 wherein the input receives a Sony/Phillips Digital Interface Format (SPDIF).

7. The BMC decoder of claim 1 wherein the input receives an Audio Engineering Society 3 (AES3) format.

8. A method of decoding a data stream comprising:
synchronizing a counter to a preamble in the data stream;
determining a sampling rate associated with the data stream;
decoding data from the data stream using the sampling rate;
wherein synchronizing the counter to the preamble in the data stream comprises:
(a) receiving an interval width;
(b) selecting a rate from a plurality of supported sampling rates;
(c) retrieving a maximum and a minimum value for a 0.5 T interval, a 1.0 T interval, a 1.5 T interval at the selected rate;
(d) determining whether the interval width and a plurality of recent intervals matches a preamble pattern associated with the preamble, said determining comprises comparing the interval width and the plurality of recent intervals to the maximum value and minimum value retrieved;
(e) if the interval width and plurality of recent intervals matches the preamble pattern then locking the rate;
(f) otherwise repeating (b)-(e) until all rates in the plurality of supported sampling rates have been selected or until the rate is locked; and
(g) repeating (a)-(f) until the rate is locked.

9. The method of claim 8, wherein decoding data from the data stream using the sampling rate comprises:
receiving an interval width;
comparing the interval width with a maximum value and a minimum value corresponding to the 0.5 T interval;
providing a 0.5 T indicator to a decoding state machine if the interval width lies between the maximum value and the minimum value corresponding to the 0.5 T interval;
comparing the interval width with a maximum value and a minimum value corresponding to the 1.0 T interval;
providing a 1.0 T indicator to a decoding state machine if the interval width lies between the maximum value and the minimum value corresponding to the 1.0 T interval;
comparing the interval width with a maximum value and a minimum value corresponding to the 1.5 T interval; and
providing a 1.5 T indicator to a decoding state machine if the interval width lies between the maximum value and the minimum value corresponding to the 1.5 T interval.

10. The method of claim 8 wherein retrieving a maximum and a minimum value for an 0.5 T interval, a 1.0 T interval, a 1.5 T interval at the selected rate comprises looking up the maximum and minimum value in a lookup table.

11. The method of claim 8 further comprising counting oversampling clock cycles between transitions between a low voltage and a high voltage in the data stream.

12. The method of claim 8 further comprising:
   counting consecutive oversampling clock cycles while the data stream is high; and
   counting consecutive oversampling clock cycles while the data stream is low.

13. The method of claim 8 wherein the data stream is an SPDIF stream.

14. The method of claim 8 wherein the data stream is an AES3 stream.

15. A decoder comprising:
   an interval width comparator further comprising:
      a synchronization module configured to compare a plurality of past interval widths of a data stream with a plurality of maximum and minimum data values for a plurality of predetermined intervals and at a plurality of sampling rates, to determine whether a match with a preamble pattern has been detected, and to generate a synchronization signal; and
      an interval state discriminator module configured to decode the data stream if the synchronization signal has been generated; and
   a decoder state machine for transitioning between a synchronization mode and a decoder mode as a function of the data stream.

16. The decoder of claim 15 further comprising a lookup table storing the plurality of maximum and minimum data values.

17. The decoder of claim 15 further comprising an interval counter configured to count clock cycles between transitions between a low voltage and a high voltage.

18. The decoder of claim 15 further comprising a high pulse counter configured to count consecutive clock cycles while the input to the decoder is high.

19. The decoder of claim 18 further comprising a low pulse counter configured to count consecutive clock cycles while the input to decoder is low.

* * * * *

UNITED STATES PATENT AND TRADEMARK OFFICE
CERTIFICATE OF CORRECTION

PATENT NO.        : 8,605,912 B2                           Page 1 of 1
APPLICATION NO.   : 13/092743
DATED             : December 10, 2013
INVENTOR(S)       : Mouna Elkhatib and Jimmy Pu It is certified that error appears in the above-identified patent and that said Letters Patent is hereby corrected as shown below:

In the Claims:

Column 9, line 65, replace "1.0 OT" with "1.0T"

Signed and Sealed this
First Day of April, 2014

Michelle K. Lee
*Deputy Director of the United States Patent and Trademark Office*